(12) United States Patent
Vallejo

(10) Patent No.: US 8,747,271 B2
(45) Date of Patent: Jun. 10, 2014

(54) WHEEL RIM ASSEMBLY AND METHOD

(75) Inventor: Carlos A. Vallejo, Erie, PA (US)

(73) Assignee: General Electric Company, Schenectady, NY (US)

( * ) Notice: Subject to any disclaimer, the term of this patent is extended or adjusted under 35 U.S.C. 154(b) by 558 days.

(21) Appl. No.: 13/046,718

(22) Filed: Mar. 12, 2011

(65) Prior Publication Data
US 2012/0231915 A1    Sep. 13, 2012

(51) Int. Cl.
*F16H 48/06* (2006.01)
(52) U.S. Cl.
USPC .......................................................... 475/149
(58) Field of Classification Search
USPC ..................... 475/149; 29/894.3; 301/105.1
See application file for complete search history.

(56) References Cited

U.S. PATENT DOCUMENTS

| 2,386,917 | A |   | 10/1945 | Thornton |          |
|-----------|---|---|---------|----------|----------|
| 3,042,145 | A |   | 7/1962  | Bixby    |          |
| 3,951,481 | A |   | 4/1976  | Ritter, Jr. |       |
| 4,873,894 | A |   | 10/1989 | Avery    |          |
| 6,080,077 | A | * | 6/2000  | Kamlukin | 475/339  |
| 6,148,941 | A |   | 11/2000 | Hinton   |          |
| 2003/0010564 | A1 |   | 1/2003 | Hinton |        |
| 2008/0070736 | A1 | * | 3/2008 | Yoshino et al. | 475/149 |
| 2009/0102275 | A1 |   | 4/2009 | Rivera |        |
| 2009/0283345 | A1 |   | 11/2009 | Kabrick |       |
| 2010/0326748 | A1 | * | 12/2010 | Sgherri et al. | 180/55 |

FOREIGN PATENT DOCUMENTS

| DE | 4101222 | 7/1991 |
|----|---------|--------|
| WO | 2009055376 A1 | 10/2008 |

OTHER PUBLICATIONS

Search Report and Written Opinion from corresponding PCT Application No. PCT/US2012/026905, dated for May 9, 2012.
PCT International Search Report mailed Apr. 1, 2009.

\* cited by examiner

*Primary Examiner* — Edwin A Young
(74) *Attorney, Agent, or Firm* — GE Global Patent Operation; John A. Kramer

(57) ABSTRACT

A wheel assembly, for use on an off-highway vehicle, includes a generally cylindrical wheel hub extending axially from a first end to a second end around an inner volume. A hub adapter is secured to the second end of the wheel hub, the hub adapter including a peripheral shoulder, which has a first shoulder surface axially facing in a direction extending from the second end towards the first end. A first wheel rim is mounted to the peripheral shoulder of the hub adapter at the first shoulder surface.

19 Claims, 6 Drawing Sheets

WHEEL RIM ASSEMBLY AND METHOD

FIELD OF THE INVENTION

Embodiments of the invention relate to wheel drive assemblies and, more particularly, to wheel rim assemblies for use with off-highway vehicles.

BACKGROUND OF THE INVENTION

Off-highway vehicles ("OHVs"), such as mining vehicles used to haul heavy payloads, usually employ motorized wheels for propelling or retarding the vehicle in an energy efficient manner. This efficiency is typically accomplished by employing a large horsepower diesel engine in conjunction with an alternator, a main traction inverter, and a pair of wheel drive assemblies housed within the rear tires of the vehicle. The diesel engine is directly associated with the alternator such that the diesel engine drives the alternator. The alternator, in turn, powers the main traction inverter, which supplies electrical power having a controlled voltage and frequency to electric drive motors of the two wheel drive assemblies. Each wheel drive assembly houses a planetary gear transmission that converts the rotation of the associated drive motor energy into a high torque low speed rotational energy output which is supplied to the rear wheels.

Typical operating loads in an OHV may exceed one hundred tons, while the gross vehicle weight and load may be several hundred tons. Indeed, the weight of a single wheel drive assembly can be in excess of ten tons, while the gross weight exerted on each tire may exceed sixty tons. As will be appreciated, it is desirable to provide reliable attachment of each tire/wheel rim to its corresponding wheel drive assembly. Tires are wear parts, however, that require periodic replacement. As such, is it also desirable to provide for efficient removal and replacement of tires from a wheel drive assembly of an OHV. Additionally, all components in an OHV are weight-controlled and it is therefore desirable to provide for attachment of tires to wheel drive assemblies using a low-weight attachment mechanism.

BRIEF DESCRIPTION OF THE INVENTION

In one embodiment of the invention, a wheel assembly for use on an off-highway vehicle includes a generally cylindrical wheel hub extending axially from a first end to a second end around an inner volume. A hub adapter is secured to the second end of the wheel hub, the hub adapter including a peripheral shoulder, which has a first shoulder surface axially facing in a direction extending from the second end towards the first end. A first wheel rim is mounted to the peripheral shoulder of the hub adapter at the first shoulder surface.

In another embodiment, a wheel assembly for use on an off-highway vehicle includes a generally cylindrical wheel hub extending axially from a first end to a second end around an inner volume, wherein the second end defines an annular end surface generally perpendicular to a longitudinal axis of the wheel hub. The assembly also includes an annular hub adapter removably attached to the annular end surface of the second end of the wheel hub, the annular hub adapter body extending axially out from the annular end surface and including an annular peripheral shoulder integral with the hub adapter body. The annular peripheral shoulder extends radially outwards from the annular hub adapter body. The annular peripheral shoulder having a first shoulder surface facing in a direction extending from the second end to the first end of the wheel hub, the first shoulder surface being generally parallel to, but radially and axially offset from, the annular end surface of the second end of the wheel hub. The annular peripheral shoulder also having a second shoulder surface facing in a direction extending from the first end to the second end of the wheel hub, the second shoulder surface being generally parallel to the first shoulder surface. The annular peripheral shoulder defines a plurality of spaced-apart bores each extending through the annular peripheral shoulder from the first shoulder surface to the second shoulder surface, each bore having a longitudinal bore axis generally parallel to the longitudinal axis of the wheel hub. The wheel hub and annular hub adapter are configured for mounting of a wheel rim to the peripheral shoulder of the annular hub adapter at the first shoulder surface by respectively passing a plurality of bolts or other fasteners through the plurality of spaced-apart bores and through correspondingly positioned bores provided in the wheel rim.

In another embodiment, a first wheel rim is secured to a wheel hub by engaging a first plurality of threaded fasteners in bores formed in an inner circumferential rim flange of the first wheel rim and in a corresponding plurality of bores formed in a peripheral flange formed on a first end of the wheel hub. A second wheel rim is mounted to a hub adapter by engaging a second plurality of threaded fasteners in bores formed in an inner circumferential rim flange of the second wheel rim and in a corresponding plurality of bores formed in a peripheral shoulder of the hub adapter. The hub adapter is secured to a second end of the wheel hub, with the rim flange of the second wheel rim disposed axially between the peripheral shoulder of the hub adapter and the first wheel rim, by engaging a third plurality of threaded fasteners in a plurality of bores formed in an annular body of the hub adapter and in a corresponding plurality of bores formed in the second end of the wheel hub.

As used herein, "unitary" is meant to include integrally formed, monolithic, or jointless components made in a single piece, such as, for example, through a casting process. Also, as used herein, the terms "substantially" or "about" are intended to indicate a condition within reasonably achievable manufacturing and assembly tolerances, relative to an ideal desired condition suitable for achieving the functional purpose of a component or assembly. By way of an example, an assembly of components in "substantial" alignment to a common axis of rotation may deviate from perfectly co-axial alignment so long as all the components can rotate as intended for accomplishing the functional purpose of the assembly.

BRIEF DESCRIPTION OF THE DRAWINGS

The present invention will be better understood from reading the following description of non-limiting embodiments, with reference to the attached drawings, wherein below.

DETAILED DESCRIPTION OF THE INVENTION

Figure 1:
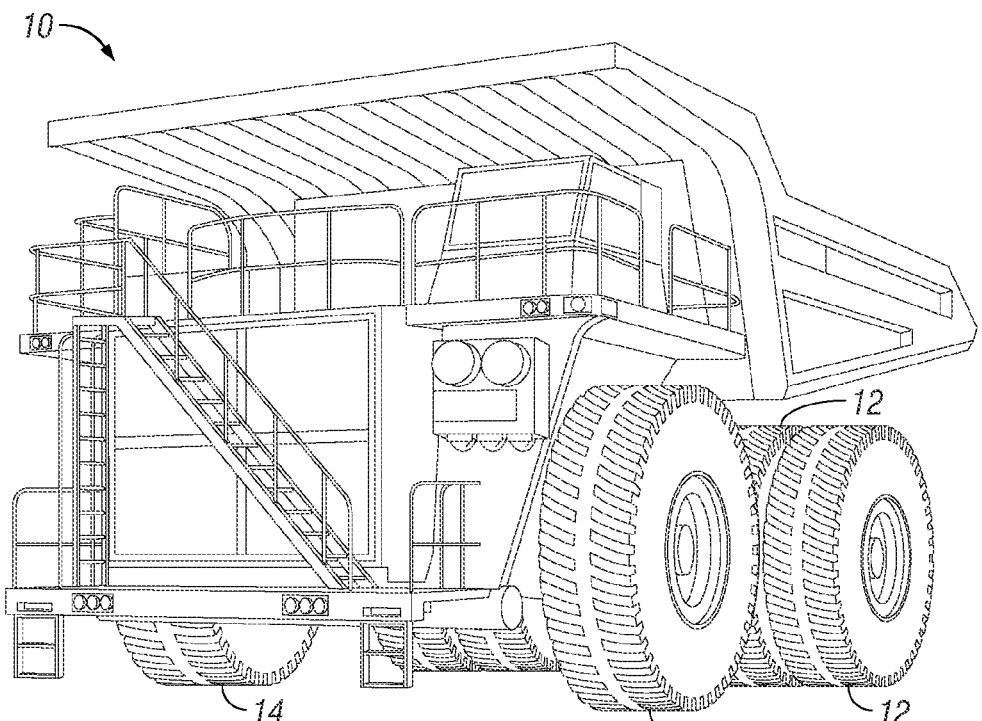
FIG. 1 is a perspective view of an OHV.

Reference will be made below in detail to exemplary embodiments of the invention, examples of which are illustrated in the accompanying drawings. Wherever possible, the same reference numerals used throughout the drawings refer to the same or like parts.

Figure 2:
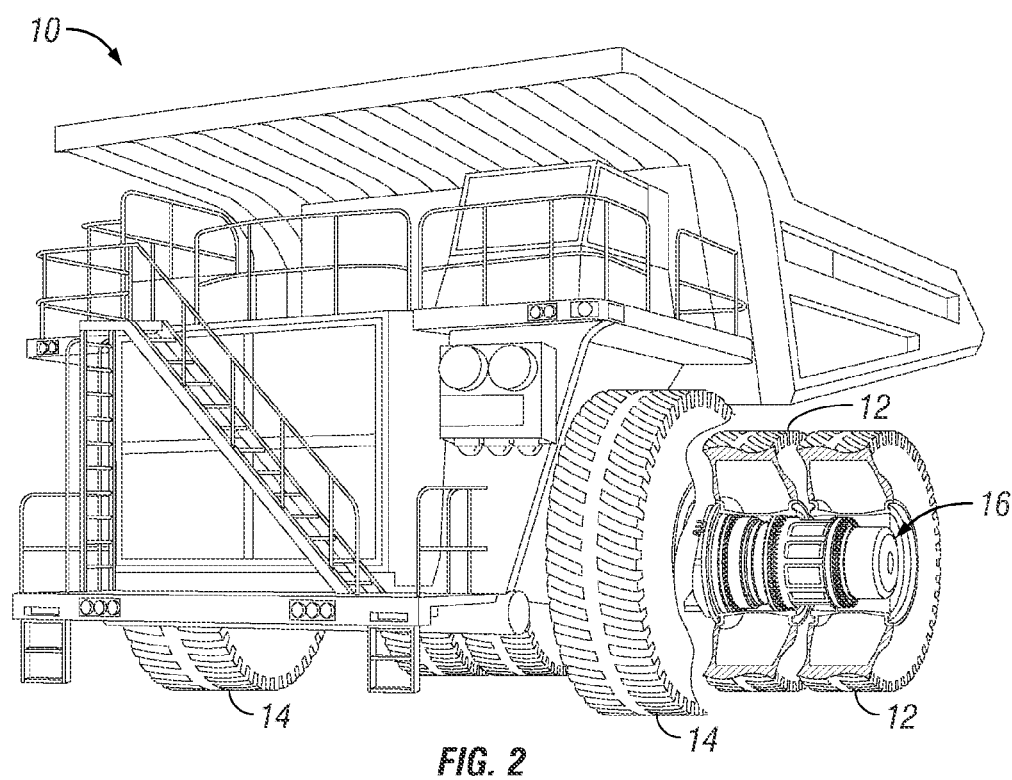
FIG. 2 is a partial perspective cutaway view showing a wheel drive assembly of the OHV shown in FIG. 1.

In some embodiments, the inventive wheel rims are configured for use with the OHV 10 depicted in FIGS. 1 and 2. As shown, the OHV 10 is supported on paired dual rear drive rim assemblies 12 and on single front steering rim assemblies 14. Each pair of rear drive tire/rim assemblies 12 are mounted on a wheel assembly 16. In various embodiments, each tire assembly 12 may have a rolling radius of between about 1.6 meters (m) and 1.8 m.

Figure 3:
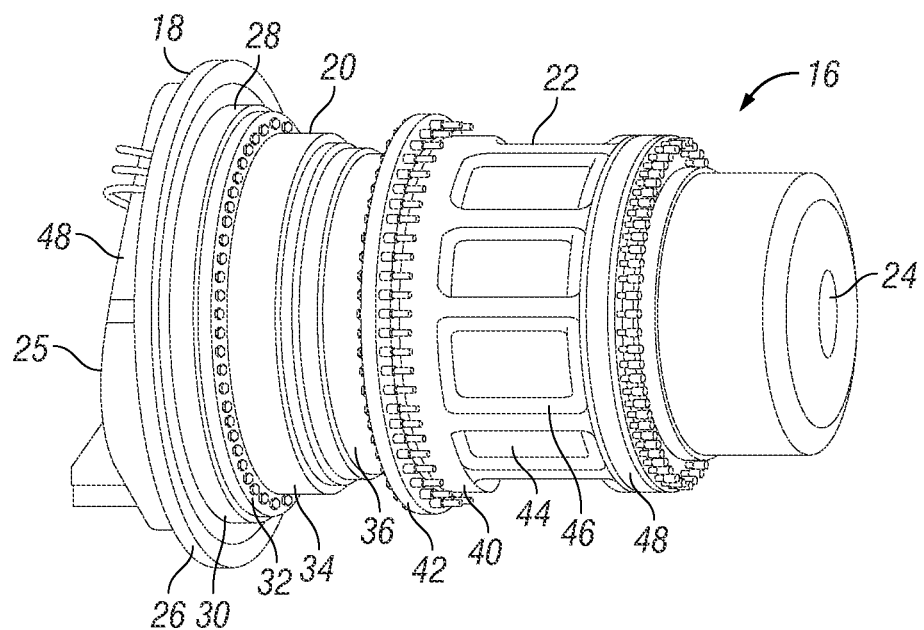
FIGS. 3 and 4 are partial side and end perspective views of the wheel drive assembly of FIG. 2.
Figure 4:
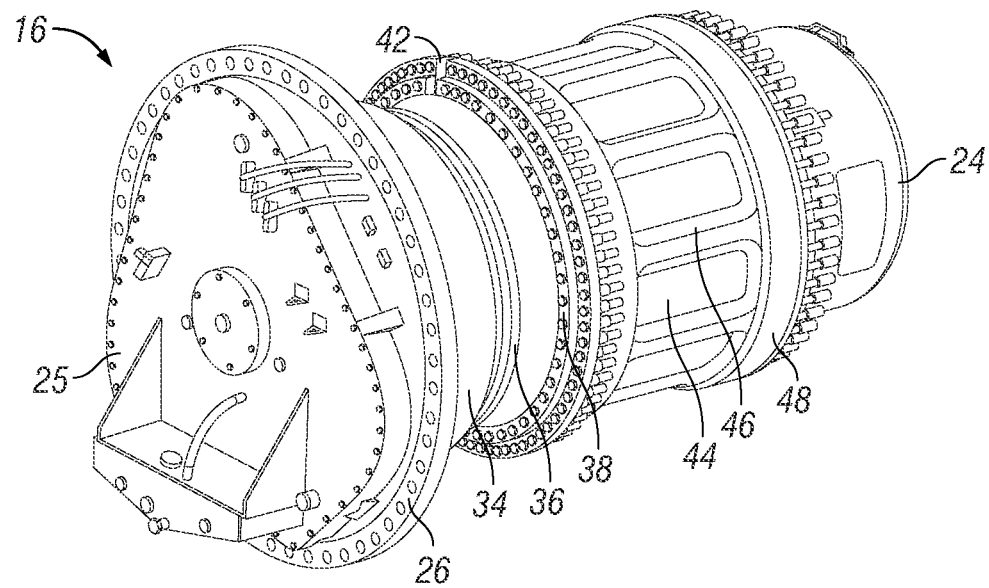

Referring to FIGS. 3 and 4, each wheel assembly 16 also includes a wheel frame 18 and a torque tube 20. The torque tube 20 is fastened to a wheel hub 22 by bolts or studs. The rim assemblies 12 also can be secured to the wheel hub 22 by threaded fasteners, as further discussed below. The torque tube 20 and the wheel hub 22 are rotatably mounted around the wheel frame 18. Axially adjacent to the wheel hub 22, a brake assembly or braking mechanism 24 is fixedly mounted to the wheel frame 18, and is operatively connected with the torque tube 20 and the wheel hub 22 via a common shaft disposed within the wheel frame 18, as further discussed below. Near the other end of the common shaft, opposite the brake assembly 24, a gear cover 25 is mounted onto the wheel frame 18.

Each wheel assembly 16 can be bolted to an axle box of the vehicle 10 by way of a mounting flange 26 provided on the wheel frame 18. The wheel frame 18 is radially tapered from the mounting flange 26, through a generally conical or hyperbolic transition portion 28, to a main cylindrical or generally cylindrical wheel frame barrel 52 (shown in FIG. 5). On the transition portion 28 of the wheel frame 18, an oil seal ring 30 is fixed to the wheel frame 18. The term "generally" as used herein in connection with, for example, "conical," "hyperbolic" and "cylindrical," refers to those general shapes and includes any surface imperfections or deviations consequent to normal manufacturing practice, and also includes intentional features deviating from the general shape. For example, the generally conical or hyperbolic transition portion 28 may include lands, grooves, notches, perforations, penetrations, and other functional features that diverge from an ideal conical or hyperbolic shape.

The torque tube 20 is generally cylindrical and includes a ring gear 34 adjacent to the oil seal ring 30. The torque tube 20 and also includes a tube barrel portion 36 that extends from the ring gear 34 along the wheel frame to a hub flange 38. On the end of the ring gear 34 adjacent to the oil seal ring 30, a complementary seal rotor body 32 is fastened to the torque tube 20.

The wheel hub 22 is also generally cylindrical, and includes a hub barrel 44 with ribs 46 (FIGS. 6-9). The hub barrel 44 and the ribs 46 extend from a first radially flared part at a first end 40 to a second radially flared part at a second end 48. The hub barrel 44 surrounds an interior volume or inner cavity 50 that is open at the ends of the barrel. The wheel hub 22 also includes a peripheral flange 42, which protrudes radially outward around the first end 40 of the wheel hub.

Figure 5:
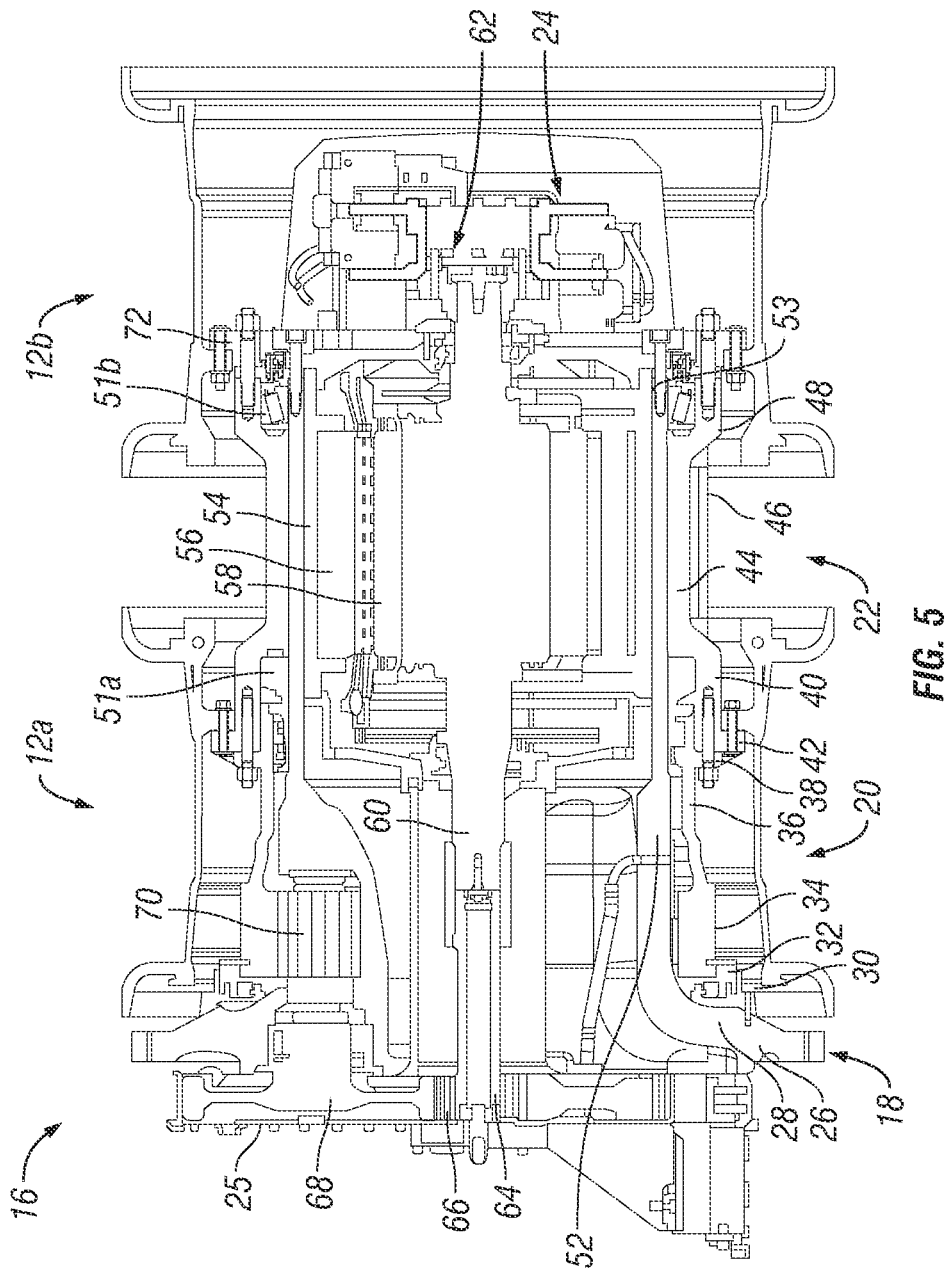
FIG. 5 is a side sectional view of the wheel drive assembly shown in FIGS. 2-4, including and depicting wheel rims, gearing, and a braking mechanism, in accordance with an embodiment of the present invention.

FIG. 5 is a side sectional view illustrating operative components of the wheel assembly 16 according to an embodiment of the present invention. In the wheel assembly 16, the first end 40 of the wheel hub 22 is disposed inboard, or closer to the mounting flange 26 of the wheel frame 18, from the second end 48 of the wheel hub 22. The hub flange 38 of the torque tube 20 is bolted to the first end 40 of the wheel hub 22. The inboard wheel rim assembly 12a is secured to the flanged portion 42 of the wheel hub 22 adjacent to the first end 40. The outboard wheel rim assembly 12b is mounted on a hub adapter 72, which is secured at the outboard or second end 48 of the wheel hub 22. At the first and second ends 40, 48 of the wheel hub 22, inboard and outboard bearings 51a, 51b, respectively, are provided radially inward from the axially inboard and outboard wheel rims 12a, 12b, to support the wheel hub on the wheel frame barrel 52.

The wheel frame barrel 52 extends from the transition portion 28 to an annular hub end surface 53, to which the brake assembly 24 is mounted. Adjacent the hub end surface 53, an electric traction motor, packaged in a casing 54, is housed inside the wheel frame 18. The electric motor casing 54 holds a stator 56 and a rotor 58. From the traction motor rotor 58, a shaft 60 protrudes toward a first end proximate to the mounting flange 26 of the wheel frame 18, and toward a second end within the brake assembly 24. Within the brake assembly 24, a brake rotor 62 is mounted onto the second end of the shaft 60. Within the transition portion 28 of the wheel frame 18, a sun gear shaft 64 is splined to the first end of the shaft 60. The sun gear shaft 64 supports a sun gear 66 housed centrally within the gear cover 25. The sun gear 66 is meshed with a plurality of planet gears 68 carried on common axles with pinion gears 70, which mesh with internal teeth of the torque tube ring gear 34. Some embodiments of the invention include three planet gears 68 and three pinion gears 70. The torque tube 20 is supported between the pinion gears 70 and the wheel hub 22.

Figure 6:
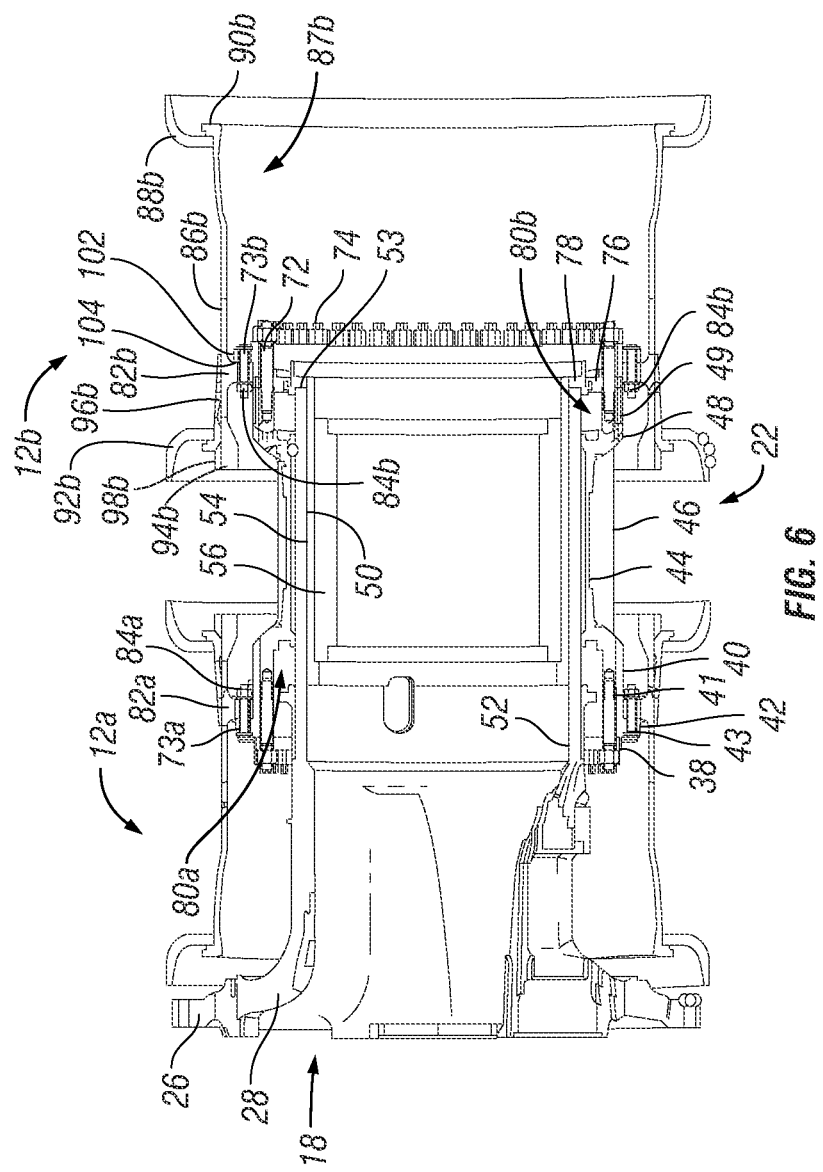
FIG. 6 is a side sectional view of the wheel drive assembly and wheel rims of FIG. 5.

FIG. 6 shows in side sectional view the unitary wheel frame 18, unitary wheel hub 22, traction motor casing 54 and stator 56, hub adapter 72, and inboard and outboard wheel rims 12a, 12b of the wheel drive assembly 16. In embodiments of the invention, the wheel frame 18 and the wheel hub 22 are formed as unitary or jointless structures, e.g., in some embodiments, as castings. The wheel hub 22 includes threaded holes 41 that are tapped into the first end 40 toward the second end 48 for bolted attachment of the torque tube 20 with the wheel hub 22. More particularly, in the embodiment shown by FIG. 6, the hub flange 38 of the torque tube 20 is clamped to the hub first end 40 by bolts passing through the hub flange 38 and threaded into the threaded holes 41. By clamping the torque tube 20 to the wheel hub 22, the inboard bearing 51a is seated in an annular bearing space 80a defined between the wheel frame barrel 52 and the flared first end 40 of the wheel hub 22. In some embodiments, the threaded holes or bores 41 are at least partly axially coincident with the peripheral flange 42.

The wheel hub 22 also includes bores 43 that extend axially through the flanged portion 42 for attachment of the inboard wheel rim 12a. The bores 43 may be threaded or smooth. In an embodiment, the bores 43 are smooth, for receiving knurled ends of knurl studs 73. The wheel hub 22 also includes threaded holes 49 that are tapped axially into the second end 48 toward the first end 40 for attachment of the hub adapter 72. In an embodiment, the holes and bores 41, 43, 49 are circumferentially spaced in a symmetric fashion and are not mutually aligned. Although bolted attachment of the rim assemblies 12a, 12b onto the wheel drive assembly 16 can be accomplished in various configurations, in the embodiment shown by FIG. 6 the holes 43 and 49 respectively support studs 73a, which have threaded ends protruding generally axially toward the second end 48, and studs 74, which protrude away from the second end 48.

Referring to the inboard and outboard wheel rim assemblies 12a, 12b, each wheel rim assembly is secured to the wheel hub 22 by way of the bolts or studs or other fasteners 73a, 73b that pass through smooth holes or bores formed in a radially inward protruding circumferential web or lip or rim flange 82a, 82b of each wheel rim assembly 12a, 12b. The rim flange 82a of the inboard tire assembly 12a is clamped against the adjacent wheel hub flanged portion 42 by tightening nuts 84a onto the studs 73a. Similarly, the rim flange 82b of the outboard wheel rim assembly 12b is clamped against the hub adapter 72 by tightening nuts 84b onto the studs 73b.

Referring to exemplary outboard rim assembly 12b, the inner circumferential lip or rim flange 82b is formed integrally with a substantially cylindrical wheelbody or wheel rim 86b that surrounds an open interior space 87b. The wheel rim 86b is disposed at a radius of between (and including) about 0.6 m and about 0.9 m from its associated wheel axis. At a first end of the wheel rim 86b, a first end flange 88b is pressed onto a conical outwardly flared shoulder 90b formed as part of the rim 86b. Opposite the first end flange 88b, a second end flange or rim 92b is releasably wedged onto a thickened portion 94b of the wheel rim 86b by one or more rim wedge rings 96b that are held in place by a lock ring 98b.

Advantageously, in some embodiments of the invention, the rim flange 82b may be positioned closer to the second end flange 92b than to the first end flange 88b. In selected embodiments of the invention, positioning the rim flange 82b closer to the releasably wedged second end flange can enable more time-efficient disassembly and overhaul of the tire assembly 12b.

In embodiments of the invention, the inboard tire assembly 12a is substantially identical to the outboard tire assembly 12b, and provision of the hub adapter 72 and the axially offset rim flanges 82a, 82b enables interchangeable attachment of the two tire assemblies 12a, 12b onto the wheel hub 22. For example, positioning the rim flange 82 at an axial location offset from an axial midplane of the wheel rim 86, can permit the relatively axially wide rim assemblies 12a, 12b to be operatively connected with the wheel drive assembly 16 utilizing the relatively axially narrow wheel hub 22. This can be accomplished by installing the inboard tire assembly 12a in a first orientation with its first end flange 88 facing inboard, then installing the hub adapter 72 onto the wheel hub 22 with the outboard tire assembly 12b attached to the hub adapter 72 in a second orientation with its first end flange 88 facing outboard, as in the exemplary embodiment shown in FIGS. 6 and 7. Utilizing the hub adapter 72 to mount on the relatively axial narrow wheel hub 22 two relatively axially wide rim assemblies 12a, 12b may provide for a lower weight wheel drive assembly with superior load carrying capacity.

Figure 7:
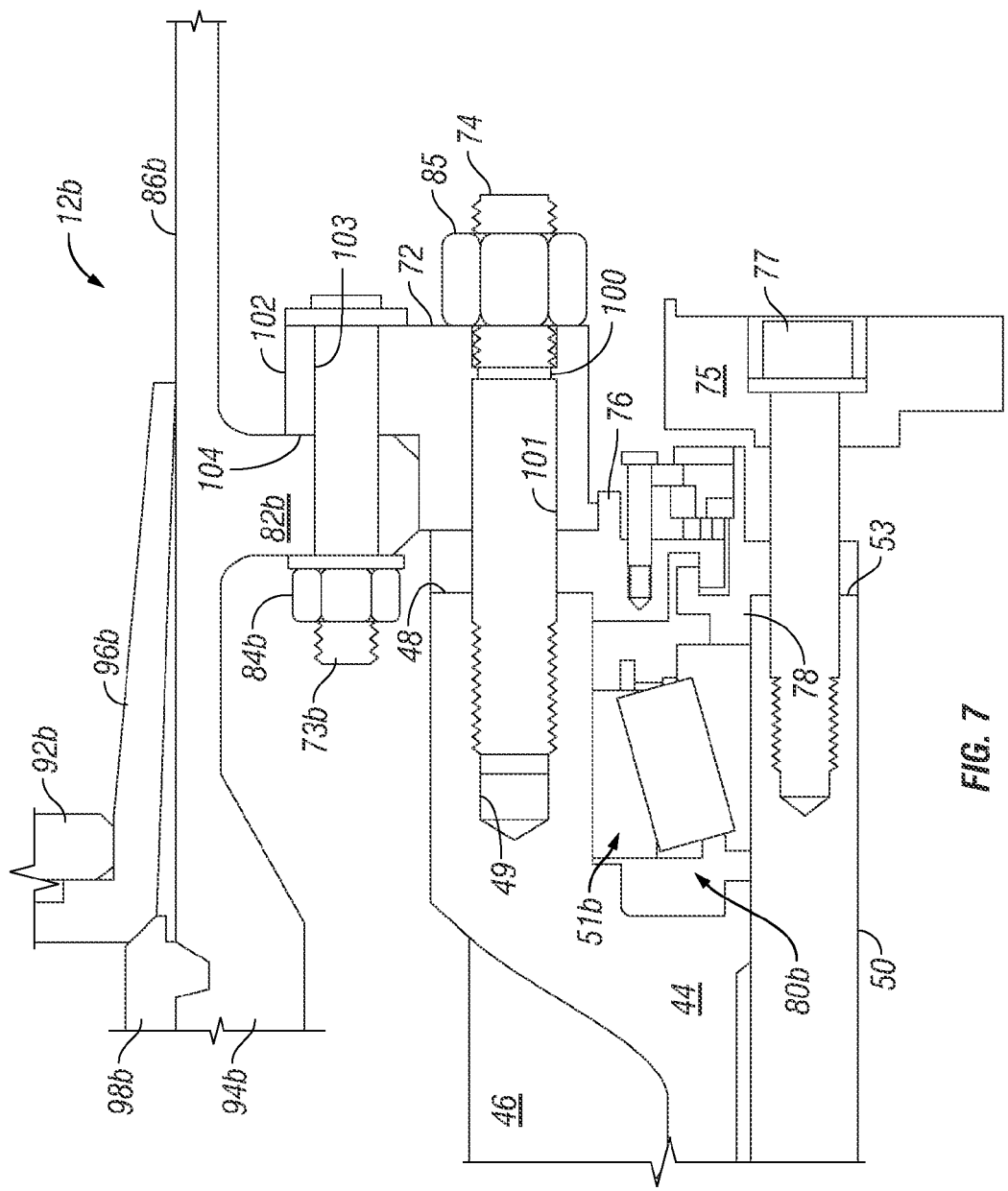
FIG. 7 is a partial expanded view of the wheel drive assembly and wheel rims shown in FIG. 6.

Referring specifically to FIG. 7, the hub adapter 72 includes a generally annular body 100 that is penetrated by a plurality of axially-extending bores 101. The bores 101 are smooth for clearance around the threaded studs 74. The hub adapter 72 is secured to the unitary wheel hub 22 by nuts 85 threaded onto the studs 74. The hub adapter 72 also includes an annular peripheral shoulder 102 that protrudes radially outwardly around an axial portion of the annulus 100. The peripheral shoulder 102 includes a plurality of bores 103 in which are installed a corresponding plurality of studs 73. By threading the nuts 84b onto the studs 73b, a circumferential inner rim flange 82b of the outboard wheel rim 12b is clamped against a first shoulder surface 104 of the shoulder 102. As shown, the first shoulder surface 104 faces "inboard" along a direction extending from the second end of the wheel hub toward the first end of the wheel hub and from the hub end surface of the wheel frame toward the mounting flange of the wheel frame. In the depicted embodiment, the disposition of the wheel rim 12b and of the hub adapter 72 relative to the wheel hub 22 facilitates assembly and removal of the wheel rim 12b onto the wheel hub 22.

Between the hub adapter 72 and the wheel hub 22, an outer grease ring 76 is captured on the shoulder bolts. Radially inward from the hub adapter 72, a brake assembly mounting ring 75 is bolted to the wheel frame hub end 53 by a plurality of shoulder bolts 77. The mounting ring 75 captures to the wheel frame 18 the motor casing (shown in FIG. 5), as well as an inner grease ring 78 that is captured on the shoulder bolts 77 between the motor casing and the wheel frame hub end 53. The grease rings provide a simple rotary joint seal to retain grease or other lubricant within an outboard bearing space 80b defined between the flared second end 48 of the wheel hub 22 and the wheel frame barrel 52 to house the outboard bearing 51b. As discussed above, the flared first end 40 of the wheel hub 22 defines the substantially similar inboard bearing space 80a proximate to the torque tube hub flange 38.

Figure 8:
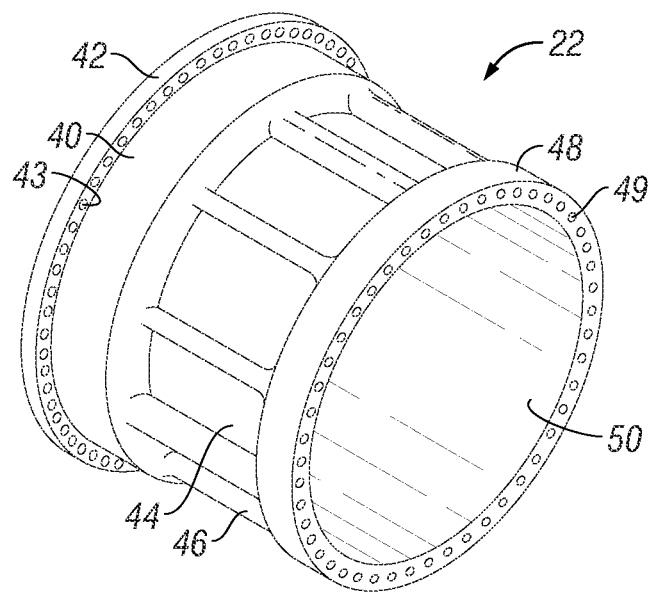
FIG. 8 is a perspective view of an outboard end of a unitary wheel hub shown in FIG. 6.
Figure 9:
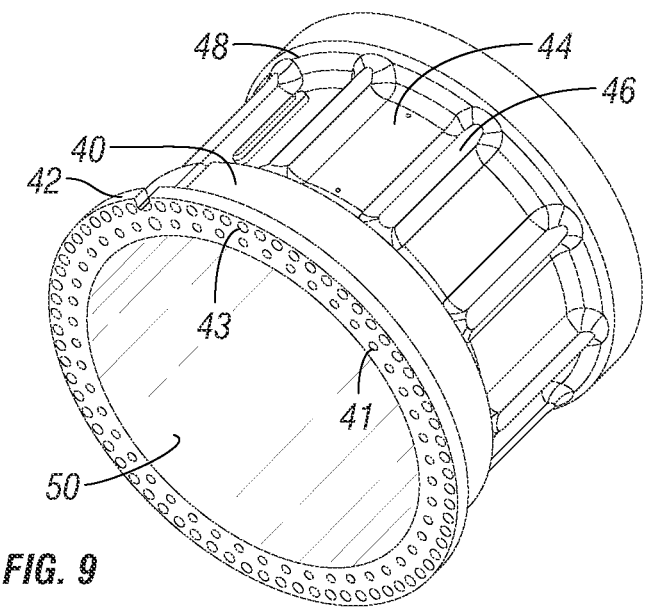
FIG. 9 is a perspective view of an inboard end of the unitary wheel hub shown in FIG. 6.

Referring to FIGS. 8 and 9, the hub barrel 44 and ribs 46 of the unitary wheel hub 22 extend from the first end 40 to the second end 48. The hub barrel 44 has an internal diameter chosen for a close clearance (non-interference, non-sliding) fit around the wheel frame barrel 52. The radially inward facing surface of the first end 40 is flared outward from the internal diameter of the hub barrel 44, to provide the annular inboard bearing space 80a for receiving the inboard bearing 51a as discussed above with reference to FIG. 5. Similarly, the radially inward facing surface of the second end 48 also is flared outward to provide the annular outboard bearing space 80b for receiving the outboard bearing 51b as discussed above with reference to FIGS. 5 and 6.

For weight reduction, the thickness of the hub barrel 44 is reduced so that the radially protruding ribs 46 transfer a substantial portion of torsional and bending loads between the inboard and outboard ends 40, 48. In some embodiments, the ribs 46 transfer a majority of torsional loads and a majority of bending loads. In select embodiments, the ribs 46 transfer more than about 75% of torsional and bending loads between the inboard and outboard ends 40, 48. In selected embodiments the reduced thickness of the hub barrel 44 can permit maintaining weight of the unitary wheel hub 22 within a maximum allotted weight, while advantageously enabling the wheel hub ends 40, 48 to be radially thickened for receiving heavy bolts or studs 73, 74. For example, SAE Grade 8 bolts may be used in selected embodiments, to provide greater strength and longevity of tire assembly attachment than can be accomplished using lighter fasteners such as rim wedges and lock rings. Use of axially-extending threaded fasteners may advantageously enable quick and well controlled attachment and removal of the wheel rim assemblies 12a, 12b onto the wheel drive assembly 16.

In an embodiment, and with reference to FIGS. 6 and 7, as a step in attaching inboard wheel rim 12a to the OHV 10, nuts 84a can be utilized to secure the inboard wheel rim 12a onto the bolts or studs 73a that are engaged in holes 43 of the flanged portion 42 formed on the hub 22, and that protrude in a substantially outboard direction from the flange 42. Then the outboard wheel rim 12b may be secured to the OHV 10 first by utilizing bolts or studs 73b and nuts 84b for attaching the outboard wheel rim 12b to the hub adapter 72, then by securing the hub adapter 72 with nuts 85 onto studs or bolts 74 installed in and protruding from the second end 48 of the hub 22.

Embodiments of the inventive wheel rims 12a, 12b and wheel assembly 16 may support loads in excess of fifty tons transverse the wheel axis. In select embodiments, the inventive wheel assembly 16 may support loads in excess of one hundred tons transverse the wheel axis. In certain embodiments, the inventive wheel assembly 16 may support loads in excess of one hundred thirty tons transverse the wheel axis.

In an embodiment of the invention, a wheel assembly, for use on an off-highway vehicle, includes a generally cylindrical wheel hub that extends axially from a first end to a second end around an inner volume. A hub adapter is secured to the second end of the wheel hub. The hub adapter includes a peripheral shoulder, which has a surface axially facing toward the first end of the wheel hub. A first wheel rim is fastened to the hub adapter peripheral shoulder at the surface axially facing toward the first end of the wheel hub. In some embodiments, the first wheel rim circumferentially surrounds an open interior and extends axially from a first end flange to a second end flange, and is fastened to the hub adapter by way of a circumferential inner rim flange that is located closer to the second end flange than to the first end flange within the open interior of the wheel rim. The open interior of the first wheel rim may be configured to accommodate a braking mechanism. The wheel assembly may further include a generally cylindrical wheel frame that defines a wheel axis and that extends along the wheel axis from a mounting flange to a hub end. In select embodiments, a generally cylindrical torque tube may be mounted around and coaxial with the wheel frame. Such a torque tube may extend from a ring gear disposed near the mounting flange of the wheel frame, to a hub flange disposed near the hub end of the wheel frame. In select embodiments, the first end of the wheel hub may be bolted to the hub flange of the torque tube, and the second end of the wheel hub may be disposed near the hub end of the wheel frame. In specific embodiments, the second end of the wheel hub may be disposed substantially coplanar with the hub end of the wheel frame, such that the second end of the wheel hub and the hub end of the wheel frame together define an annular outboard bearing space.

In an embodiment, the mounting flange of the wheel frame may be bolted to an off-highway vehicle. In select embodiments, the wheel assembly is capable of supporting at least about fifty tons transverse to the wheel axis at the mounting flange of the wheel frame and at the wheel hub.

In an embodiment, the wheel hub of the wheel assembly may include a cylindrical or substantially cylindrical hub barrel defining a hub axis and extending along the hub axis from a first end to a second end. The hub barrel may have, at the first end of the barrel, a first flared part that includes a first plurality of threaded holes extending axially into the first flared part toward the barrel. The hub flange of the torque tube may be bolted into the first plurality of threaded holes. The peripheral flange of the wheel hub may protrude radially outward from an axial portion of the first flared part. At the second end of the hub barrel, a second flared part may include a second plurality of threaded holes extending axially into the second flared part toward the hub barrel. The hub adapter may be bolted into the second plurality of threaded holes in the second flared part. Such a wheel hub may be installed on the wheel frame with the hub axis and the wheel axis co-axial.

In an embodiment, the wheel assembly may further include a motor mounted into the hub end of the wheel frame. The motor shaft may extend in a first direction along the wheel axis toward the mounting flange of the wheel frame, and may be operatively connected to a planetary gear set housed in the mounting flange of the wheel frame, including a sun gear operatively connected to the shaft of the motor, a plurality of planet gears engaging the sun gear, and a plurality of pinion gears each mounted on a pinion shaft extending from one of the planet gears toward the hub end of the wheel frame. Each pinion gear may engage the ring gear of the torque tube via a pinion gear aperture formed through the wheel frame. In some embodiments, the shaft of the motor may also extend in a second direction along the wheel axis to an end carrying a rotor that is operatively engageable by a braking mechanism mounted to the hub end of the wheel frame.

In an embodiment, the first wheel rim may be fastened to the hub adapter by a first plurality of axially-extending studs disposed radially outward from a second plurality of axially-extending studs that secure the hub adapter to the wheel hub. The wheel hub may further include a radially outward protruding peripheral flange formed near the first end of the wheel hub. The peripheral flange of the wheel hub may have a surface facing toward the second end of the wheel hub, and a second wheel rim may be secured to the peripheral flange at the surface facing toward the second end of the wheel hub. The second wheel rim may be installed on the wheel hub with the circumferential inner rim flange of the second wheel rim located between the peripheral flange of the wheel hub and the second end of the wheel hub. The second wheel rim may be substantially identical to the first wheel rim.

In an embodiment, the wheel hub may be a unitary cast product or casting. "Casting," as used herein, refers to a manufacturing process by which a liquid material is introduced into, and allowed to solidify within, a mold or hollow cavity shaped as a desired product. "Casting" also may refer to the solidified product that is ejected from or broken out of the mold to complete the casting process.

In another embodiment, a first wheel rim is secured to a wheel hub by engaging a first plurality of threaded fasteners in bores formed in an inner circumferential rim flange of the first wheel rim and in a corresponding plurality of bores formed in a peripheral flange formed on a first end of the wheel hub. A second wheel rim is mounted to a hub adapter by engaging a second plurality of threaded fasteners in bores formed in an inner circumferential rim flange of the second wheel rim and in a corresponding plurality of bores formed in a peripheral shoulder of the hub adapter. The hub adapter is secured to a second end of the wheel hub, with the rim flange of the second wheel rim disposed axially between the peripheral shoulder of the hub adapter and the first wheel rim, by engaging a third plurality of threaded fasteners in a plurality of bores formed in an annular body of the hub adapter and in a corresponding plurality of bores formed in the second end of the wheel hub.

In an embodiment of the invention, a wheel assembly, for use on an off-highway vehicle, includes a generally cylindrical wheel hub and an annular hub adapter that is fastened to the wheel hub. The wheel hub extends axially from a first end to a second end around an inner volume. The second end of the wheel hub defines an annular end surface generally perpendicular to a longitudinal axis of the wheel hub. The annular hub adapter is removably attached to the annular end surface of the second end of the wheel hub. The hub adapter comprises an annular hub adapter body extending axially out from the annular end surface of the wheel hub, and an annular peripheral shoulder integral with, and extending radially outwards from, the annular hub adapter body. The annular peripheral shoulder of the hub adapter has a first shoulder surface facing in a direction extending from the second end to the first end of the wheel hub. The first shoulder surface is generally parallel to, but radially and axially offset from, the annular end surface of the second end of the wheel hub. The annular peripheral shoulder also has a second shoulder surface facing in a direction extending from the first end to the second end of the wheel hub. The second shoulder surface is generally parallel to the first shoulder surface, and may be generally co-planar with an end surface of the hub adapter body. The annular peripheral shoulder defines a plurality of spaced-apart bores each extending through the annular peripheral shoulder from the first shoulder surface to the second shoulder surface. Each of these bores defines a longitudinal bore axis generally parallel to the longitudinal axis of the wheel hub. The wheel hub and the hub adapter are configured for mounting of a wheel rim to the peripheral shoulder of the annular hub adapter at the first shoulder surface, by respectively passing a plurality of bolts or other fasteners through the plurality of spaced-apart bores and through correspondingly positioned bores provided in the wheel rim.

In an embodiment, the first end of the wheel hub may include a first plurality of bores indented axially into the wheel hub toward the second end, and may also include a generally annular peripheral flange extending around a portion of the first end at least partly axially coincident with the first plurality of bores. The peripheral flange may include a second plurality of bores indented through the peripheral flange at locations radially outward and circumferentially offset from the first plurality of bores, and configured for mounting to the wheel hub another wheel rim. The wheel assembly may further include a wheel frame extending from a mounting flange to a hub end, with the wheel hub rotatably mounted around a portion of the wheel frame adjacent to the hub end. The wheel assembly may also include a generally cylindrical torque tube rotatably mounted around a portion of the wheel frame between the wheel hub and the mounting flange, the torque tube having a generally annular first end disposed proximate to the mounting flange and having a generally annular second end rigidly fastened to and supported by the wheel hub via fasteners inserted into the first plurality of bores in the wheel hub. The mounting flange of the wheel frame may be generally annular, and the hub end of the wheel frame may be generally annular and of smaller diameter than the mounting flange. In such an embodiment, the mounting flange can be joined integrally with the hub end via a generally hyperbolic transition portion adjacent to the mounting flange and via a generally cylindrical barrel portion extending from the transition portion to the hub end. The transition portion of the wheel frame can include a plurality of pinion gear apertures, and the first end of the torque tube can include an inwardly-toothed ring gear that surrounds the pinion gear apertures. In an embodiment including a planetary gearset housed within the transition portion of the wheel frame and driven by a motor housed within the barrel portion of the wheel frame, the planetary gearset can include pinions that protrude through the pinion gear apertures of the wheel frame to engage with and radially support the ring gear of the torque tube.

One of ordinary skill in the art will understand that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting and are exemplary embodiments. Many other embodiments will be apparent to those of ordinary skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," "third," "upper," "lower," "bottom," "top," etc. are used merely as labels, and are not intended to impose numerical or positional requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose several embodiments of the invention, including the best mode, and also to enable any person of ordinary skill in the art to practice the embodiments of invention, including making and using any devices or systems and performing any incorporated methods. The patentable scope of the invention is defined by the claims, and may include other examples that occur to those ordinarily skilled in the art. Such other examples are intended to be within the scope of the claims if they have structural elements that do not differ from the literal language of the claims, or if they include equivalent structural elements with insubstantial differences from the literal languages of the claims.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the above-described wheel rim, assembly, and method for assembly, without departing from the spirit and scope of the invention herein involved, it is intended that all of the subject matter of the above description or shown in the accompanying drawings shall be interpreted merely as examples illustrating the inventive concept herein and shall not be construed as limiting the invention.

What is claimed is:

1. A wheel assembly, for use on an off-highway vehicle, comprising:
    a generally cylindrical wheel hub extending axially from a first end to a second end around an inner volume;
    a hub adapter secured to the second end of the wheel hub, the hub adapter including a peripheral shoulder, which has a first shoulder surface axially facing in a direction extending from the second end towards the first end;
    a first wheel rim mounted to the peripheral shoulder of the hub adapter at the first shoulder surface; and
    a generally cylindrical wheel frame defining a wheel axis and extending along the wheel axis from a mounting flange to a hub end;
    a generally cylindrical torque tube mounted around and coaxial with the wheel frame, the torque tube extending from a ring gear, proximate to the mounting flange of the wheel frame, to a hub flange proximate to the hub end of the wheel frame; and
    wherein the first end of the wheel hub is bolted to the hub flange of the torque tube and the second end of the wheel hub is disposed near the hub end of the wheel frame.

2. The wheel assembly of claim 1, wherein the first wheel rim circumferentially surrounds an open interior and extends axially from a first end flange to a second end flange, and is fastened to the hub adapter by way of a circumferential inner rim flange that is located closer to the second end flange than to the first end flange within the open interior of the first wheel rim.

3. The wheel assembly of claim 2, wherein the open interior of the first wheel rim is configured to accommodate a braking mechanism.

4. The wheel assembly of claim 1, wherein the second end of the wheel hub is disposed substantially coplanar with the hub end of the wheel frame.

5. The wheel assembly of claim 1, wherein the second end of the wheel hub and the hub end of the wheel frame together define an annular outboard bearing space.

6. The wheel assembly of claim 1, wherein the mounting flange of the wheel frame is bolted to an off-highway vehicle.

7. The wheel assembly of claim 1, wherein the assembly is capable of supporting at least about fifty tons transverse to the wheel axis at the mounting flange of the wheel frame and at the wheel hub.

8. The wheel assembly of claim 1, wherein the wheel hub includes:
   a cylindrical or substantially cylindrical hub barrel defining a hub axis and extending along the hub axis from the first end to the second end;
   a first flared part at the first end of the barrel, the first flared part including a first plurality of threaded holes extending axially into the first flared part toward the barrel, the hub flange of the torque tube being bolted into the first plurality of threaded holes;
   a peripheral flange protruding radially outward from an axial portion of the first flared part;
   a second flared part at the second end of the hub barrel, the second flared part including a second plurality of threaded holes extending axially into the second flared part toward the hub barrel, the hub adapter being bolted into the second plurality of threaded holes in the second flared part; and
   wherein the wheel hub is installed on the wheel frame with the hub axis and the wheel axis co-axial.

9. The wheel assembly of claim 1, further comprising:
   a motor mounted into the hub end of the wheel frame and having a shaft that extends in a first direction along the wheel axis toward the mounting flange of the wheel frame; and
   a planetary gear set housed in the mounting flange of the wheel frame, including a sun gear operatively connected to the shaft of the motor, a plurality of planet gears engaging the sun gear, and a plurality of pinion gears each mounted on a pinion shaft extending from one of the planet gears toward the hub end of the wheel frame, each pinion gear engaging the ring gear of the torque tube via a pinion gear aperture formed through the wheel frame.

10. The wheel assembly of claim 9, wherein the shaft of the motor also extends in a second direction along the wheel axis to an end carrying a rotor that is operatively engageable by a braking mechanism mounted to the hub end of the wheel frame.

11. The wheel assembly of claim 1, wherein the first wheel rim is mounted to the hub adapter on a first plurality of axially-extending studs disposed radially outward from a second plurality of axially-extending studs that secure the hub adapter to the wheel hub.

12. The wheel assembly of claim 1, wherein the wheel hub is a unitary cast product.

13. A wheel assembly, for use on an off-highway vehicle, comprising:
   a generally cylindrical wheel hub extending axially from a first end to a second end around an inner volume;
   a hub adapter secured to the second end of the wheel hub, the hub adapter including a peripheral shoulder, which has a first shoulder surface axially facing in a direction extending from the second end towards the first end; and
   a first wheel rim mounted to the peripheral shoulder of the hub adapter at the first shoulder surface,
   wherein the wheel hub also includes, proximate the first end, a radially outwardly protruding peripheral flange, which has a surface facing toward the second end of the wheel hub, and wherein a second wheel rim is fastened to the peripheral flange of the wheel hub at the surface facing toward the second end of the wheel hub.

14. The wheel assembly of claim 13, wherein the second wheel rim is substantially identical to the first wheel rim.

15. The wheel assembly of claim 14, wherein the second wheel rim is installed on the wheel hub with the circumferential inner rim flange of the second wheel rim located between the peripheral flange of the wheel hub and the second end of the wheel hub.

16. A wheel assembly, for use on an off-highway vehicle, comprising:
   a generally cylindrical wheel hub extending axially from a first end to a second end around an inner volume, wherein the second end defines an annular end surface generally perpendicular to a longitudinal axis of the wheel hub;
   an annular hub adapter removably attached to the annular end surface of the second end of the wheel hub; and
   wherein the annular hub adapter comprises an annular hub adapter body extending axially out from the annular end surface and an annular peripheral shoulder integral with the hub adapter body, the annular peripheral shoulder extending radially outwards from the annular hub adapter body, and
   the annular peripheral shoulder having a first shoulder surface facing in a direction extending from the second end to the first end of the wheel hub, the first shoulder surface being generally parallel to, but radially and axially offset from, the annular end surface of the second end of the wheel hub, and the annular peripheral shoulder having a second shoulder surface facing in a direction extending from the first end to the second end of the wheel hub, the second shoulder surface being generally parallel to the first shoulder surface, and
   wherein the annular peripheral shoulder defines a plurality of spaced-apart bores each extending through the annular peripheral shoulder from the first shoulder surface to the second shoulder surface, each bore having a longitudinal bore axis generally parallel to the longitudinal axis of the wheel hub, and
   wherein the wheel hub and annular hub adapter are configured for mounting of a wheel rim to the peripheral shoulder of the annular hub adapter at the first shoulder surface by respectively passing a plurality of bolts or other fasteners through the plurality of spaced-apart bores and through correspondingly positioned bores provided in the wheel rim, and
   wherein the first end of the wheel hub includes a first plurality of bores indented axially into the wheel hub toward the second end, and includes a generally annular peripheral flange extending around a portion of the first end at least partly axially coincident with the first plurality of bores, the peripheral flange including a second plurality of bores indented through the peripheral flange at locations radially outward and circumferentially offset from the first plurality of bores.

17. The wheel assembly of claim 16, further comprising:
a wheel frame extending from a mounting flange to a hub end, with the wheel hub rotatably mounted around a portion of the wheel frame adjacent to the hub end; and
a generally cylindrical torque tube rotatably mounted around a portion of the wheel frame between the wheel hub and the mounting flange, the torque tube having a generally annular first end disposed proximate to the mounting flange and having a generally annular second end rigidly fastened to and supported by the wheel hub via fasteners inserted into the first plurality of bores in the wheel hub.

18. The wheel assembly of claim 17, wherein the mounting flange of the wheel frame is generally annular, and the hub end of the wheel frame is generally annular and of smaller diameter than the mounting flange, and the mounting flange is joined integrally with the hub end via a generally hyperbolic transition portion adjacent to the mounting flange and via a generally cylindrical barrel portion extending from the transition portion to the hub end, the transition portion of the wheel frame including a plurality of pinion gear apertures, and the first end of the torque tube including an inwardly-toothed ring gear that surrounds the pinion gear apertures.

19. The wheel assembly of claim 18, further comprising a planetary gearset housed within the transition portion of the wheel frame and driven by a motor housed within the barrel portion of the wheel frame, the planetary gearset including pinions that protrude through the pinion gear apertures of the wheel frame to engage with and radially support the ring gear of the torque tube.

* * * * *